United States Patent [19]

Miessler

[11] Patent Number: 4,468,363

[45] Date of Patent: Aug. 28, 1984

[54] INTERNAL MOLD GATING METHOD AND APPARATUS

[75] Inventor: James D. Miessler, Springfield, Va.

[73] Assignee: Versar Inc., Springfield, Va.

[21] Appl. No.: 463,104

[22] Filed: Feb. 2, 1983

[51] Int. Cl.³ .............................................. B29J 5/00
[52] U.S. Cl. .................................. 264/128; 264/261;
264/328.1; 264/DIG. 6; 425/129 R; 249/107;
52/743
[58] Field of Search ............... 249/107, 109; 264/45.3,
264/101, 128, 261, 328.1, 328.9, DIG. 43, 109,
122, DIG. 6, DIG. 11; 425/129 R, DIG. 101,
DIG. 122; 52/743

[56] References Cited

U.S. PATENT DOCUMENTS

| | | |
|---|---|---|
| 1,579,743 | 4/1924 | Warlow, Jr. |
| 1,733,699 | 10/1929 | Schutte .............................. 264/101 |
| 2,167,200 | 7/1939 | Dahlberg ........................... 264/101 |
| 2,466,235 | 4/1949 | Hawk et al. |
| 3,598,175 | 8/1971 | Olsson et al. |
| 3,608,029 | 9/1971 | Hough .............................. 264/128 |

Primary Examiner—Donald Czaja
Assistant Examiner—V. Fischbach
Attorney, Agent, or Firm—Dowell & Dowell

[57] ABSTRACT

A process and apparatus for the internal gating of molds used to make a shaped article of aggregate filler infiltrated with a curable binder, including preparing a mold having a cavity and having gating tubes extending through the mold cavity and spaced from its surfaces, and the gating tubes having walls with multiple openings therethrough which are located inside the mold cavity, the cavity being dry-packed outside of the tubes with aggregate filler and the interstitial spaces therebetween being pumped full of liquid binder to form a matrix, the binder entering through the tubes and their openings and progressively expanding through the interstices while expelling air from breather holes, the binder then being cured in the mold either with the tubes still in place or with the tubes removed and the spaces filled with similar aggregate and binder before curing is completed. To prevent aggregate from entering the tubes before pumping of the binder begins, a snug fitting rod can be inserted in each tube at one end, and then the pump can be started to inject liquid binder into the other end of the tube while withdrawing the rod from said one end of the tube at a rate proportional to the rate at which the mold fills with binder. The tubes can be bent to follow curved contours of the mold, and the mold can be evacuated of air while the binder is being infiltrated.

19 Claims, 10 Drawing Figures

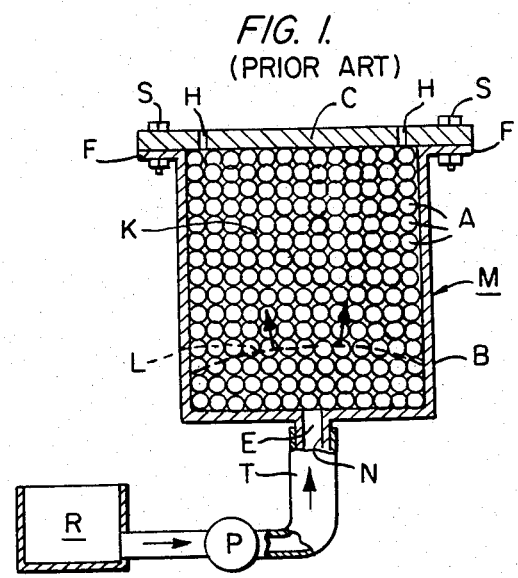
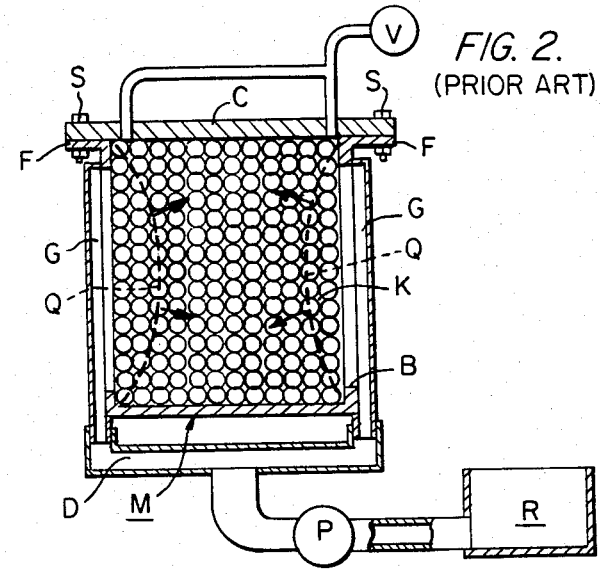
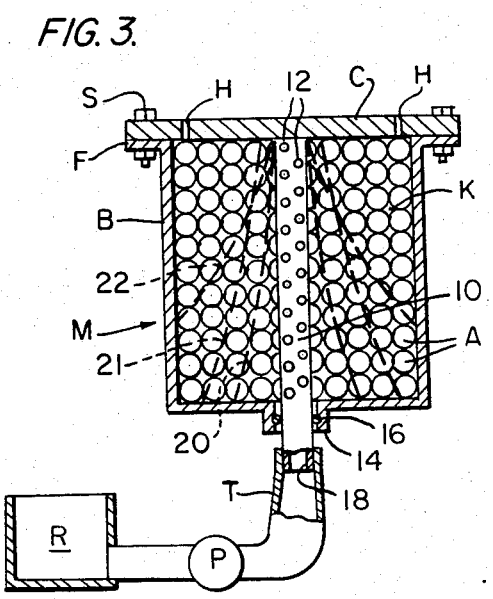
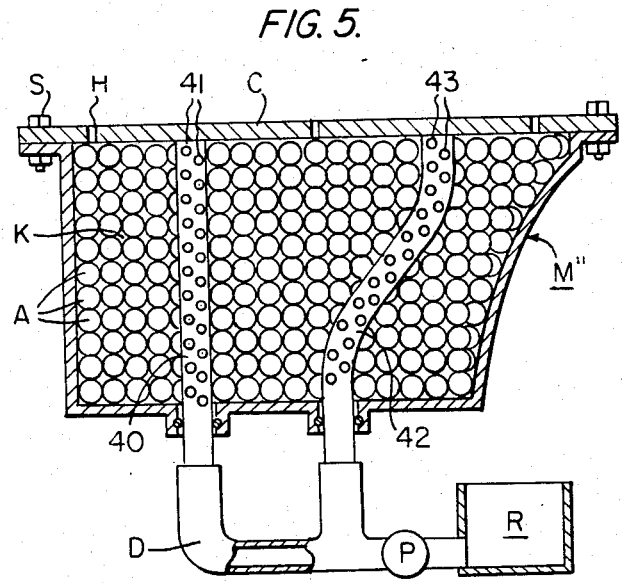
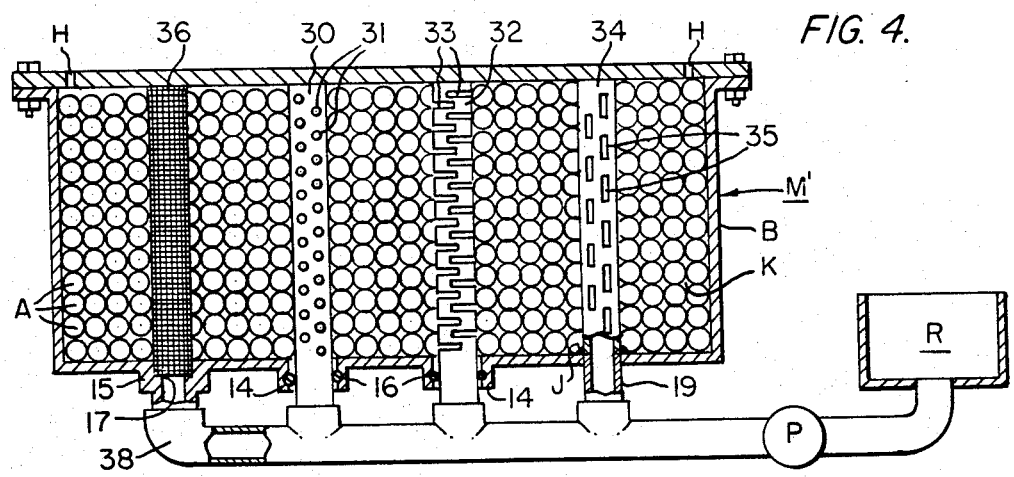

INTERNAL MOLD GATING METHOD AND APPARATUS

BACKGROUND AND PRIOR ART

This invention relates to a method and appartus for filling molds with a binder material using internal gating techniques, particularly where the mold cavity is closely packed with a filler aggregate to leave relatively small interstices, so that it is difficult to infiltrate the binder without leaving unfilled voids between the aggregate.

This invention is of particular interest in connection with the manufacture of syntactic foam buoyancy modules of the type used to increase the buoyancy of undersea apparatus, for instance, apparatus used in marine drilling rigs, or used in deep submersible vessels to provide buoyancy. Since these buoyancy modules are often submerged to great depths during their normal use, it is absolutely essential that the binder fully impregnate the interstices between the filler aggregate so that no air spaces remain, which air spaces contribute to the rapid deterioration or collapse of the modules which have been made defective by the presence of unfilled voids.

Such buoyancy modules are preferably made in molds whose cavities have been packed with aggregate comprising macrospheres which range in diameter from about 0.5 millimeters up to several inches or more. Often a mixture of different diameters of aggregate will be used to increase the packing factor of the aggregate. The packed molds are then filled with a curable resin binder which preferably takes the form of a syntactic foam comprising, itself, a composite material of hollow microspheres typically having diameters ranging around 60 microns. These microspheres are mixed with an uncured thermosetting polymeric resin which cures after injection into the mold to form a low density rigid matrix which fills the interstices between the macrospheres. This syntactic foam binder is often mixed under vacuum to insure that no free air is entrained therein. In order to achieve the lowest possible density for the matrix binder, the largest possible number of microspheres must be close-packed within the resin. It is of course not possible to achieve the highest ultimate degree of packing of microspheres by mixing them with the resin before filling the mold with it because the resin will become too viscous to flow as the number of microspheres approaches maximum. Therefore, packing of dry free-flowing microspheres into the mold containing the macrospheres will achieve the highest packing possible. Vibration and tamping techniques can be helpful in causing the microspheres and macrospheres to settle in an efficient array. The mold is closed, evacuated of free air, and neat matrix resin is then infiltrated into the voids between the aggregate filler spheres, often with the aid of pressurization of the source of resin to decrease the infiltration time. According to prior art techniques, the resin is sometimes introduced from a manifold through more than one periperal entry port in the mold where a larger buoyancy module is being molded.

However, even where more than one entry port is used to introduce the resin or syntactic foam binder, the infiltration of the aggregate is unnecessarily slowed by the fact that the binder must continuously flow a long path through the filler aggregate from an opening to the farthest air bleeder outlet. This has two very serious practical disadvantages. One is the slowness of infiltration due to long and tortuous paths of travel for the binder, requiring the use of relatively high pumping pressures. The other disadvantage results from the use of high pumping pressures which creates a strong tendency of the entering binder to push the aggregate spheres away from the entry port by bunching them more tightly in the far portions of the mold. This latter effect creates a zone near the entry ports where there is no aggregate remaining.

In addition the frictional pressure of the filler as it is pumped between the macrospheres tends to crush some of them, which crushing is aided by the fact that the contacts between spheres are virtually point-contacts where the unit-area pressures are very high.

When aggregate spheres are crushed, free air voids appear in the finished buoyancy modules and these voids contribute to failures of the modules under the extremes of deep ocean water pressures. A module having multiple free air voids fails by having the sea water pressure crush its way into a void near the surface of the module, and then travel progressively from one void to the next into the interior of the module. Pockets of submersion-induced pressures can thus cause submerged modules to implode.

According to the usual techniques for manufacturing buoyancy modules, the binder foam or neat resin is forced to infiltrate the interstices between the aggregate filler using external pumping pressure, or evacuation of the mold, or both. The binder is introduced at one or more entry ports through the periphery of the mold. Depending on the size and shape of the mold, upon the particle sizes and the size-distribution in the mold, and upon the viscosity of the binder, the infiltration process might take several hours using prior art techniques. The use of vibrators can increase the flow rate within limitations, and the total infiltration time can be further reduced by using multiple entry ports. In some instances the prior art has used external gating wherein the foam enters the mold along a series of peripheral linear ports rather than at discrete holes, and this technique has been used in combination with evacuation of air from the mold. This peripheral linear-port technique resembles somewhat the metal mold filling apparatus shown in U.S. Pat. No. 2,446,235 to Hawk et al.

U.S. Pat. No. 1,579,743 to Warlow Jr., and U.S. Pat. No. 3,598,175 to Olsson et al both show a mold housing having multiple individual identical molds arrayed in the housing and all being fed from a central gate tube having holes opposite each of the individual molds to fill them. However, highly liquid metal is being introduced through this gating, which seeks to fill the molds quickly before the metal cools, and which requires filling all the individual molds approximately simultaneously. There is no aggregate filler occupying any of the molds shown. Moreover, filling pressures need not be high because there are no tortuous interstitial spaces to be filled and the filler is not viscous.

THE INVENTION

This invention provides a process and apparatus for molding shaped articles, such as buoyancy modules, comprising a composite of aggregate macrosphere and/or microsphere fillers and a curable matrix binder of neat polymeric resin or syntactic foam comprising such resin filled with microspheres to reduce its density. A mold cavity is provided with one or more hollow gating tubes extending through it in spaced relationship to its interior surfaces, and each gating tube having at least one end protruding outside the mold through which the matrix binder is pumped into the mold, each hollow tube being perforated along its entire length within the cavity to provide openings for the binder to exit from the tube into the cavity so that it flows from the tube into the aggregate filler adjacent thereto along a more or less conical front which expands in all directions from the tube into the cavity of the mold. The mold is provided with breather holes through which air can escape from the cavity, the holes being strategically located in the corners of the mold which are the last to be impregnated by the matrix binder. Similar holes can be used to evacuate air from the cavity in cases where vacuum infiltration is used. Since the tubes are spaced from the internal walls of the mold, a much higher rate of infiltration can be achieved at a lower pumping pressure, whereby the mold fills more quickly with less danger of warping the mold, crushing some of the aggregate spheres or driving the whole mass of aggregate spheres away from the gating tubes. Where the mold is irregularly or complexly curved, similarly bent tubes can follow its contour to improve the distribution, and when the interstices have been completely filled, the tubes can be left in the finished articles and cut off near their surfaces. Alternatively, the gating tubes can be withdrawn from the mold and the resulting space packed with resin-mixed aggregate before the final curing of the binder. In cases where a mixture of large and small sizes of aggregate spheres is used to drypack the mold cavity, a solid rod can be inserted in the tube from an end not attached to the binder pump, the rod snugly filling the gating tube and closing its binder openings so that those aggregate spheres which are smaller than the openings will be kept out of the tubing bore. Then, while the binder is being pumped into one end of the tubing, the rod is withdrawn from its other end as the tubing fills with binder, thereby keeping the aggregate from entering the tubing during infiltration of the cavity. The rod can be withdrawn from the tubing at a slow rate which is controlled to be proportional to the rate of filling of the cavity so as to exercise control over the slope of the conical front along which infiltration of the interstices progresses. The various holes through the walls of the mold can be plugged after infiltration of the binder and while it is curing, and the binder can be maintained under some pressure during curing if desired.

OBJECTS AND ADVANTAGES OF THE INVENTION

It is the principal object of this invention to provide an improved process and apparatus for infiltrating an aggregate packed mold with a viscous binder to reduce the time required for void-free filling of the interstices between the filler particles.

It is another major object of the invention to provide an improved process and apparatus of the above type wherein the pressure required to infiltrate the binder into the filler can be kept to a low enough level to avoid deformation of the mold itself so that tolerances of the finished product can be maintained, and to avoid displacement and/or breakage of filler aggregate. The present internal gating technique introduces the viscous binder simultaneously over a large area of the filler whereby the infiltration of the interstices progresses quickly and easily at a lower pressure than is the case in prior art systems wherein the filler is introduced from only one or a few peripheral ports through the walls of the mold. Since the gate tubes in the present invention are spaced from the wall surfaces of the mold, the filler is introduced in all directions from the openings in the walls of the tubes.

Still another object of the invention is to achieve a more void-free infiltration of the filler because the flow pattern of the binder is more uniform and orderly when introduced by internal gating techniques.

Another object is to provide a more homogeneous article because of the uniform flow pattern of the binder and because the lower pressure at which the binder is introduced avoids undesirable crowding of the filler particles away from the points of introduction thereof. Moreover, any such crowding tends to be mostly in the center of the finished article rather than on its outer peripheral surfaces.

It is a further object of the invention to provide an improved process and apparatus which lends itself to the use of multiple internal gating tubes which can be arranged to provide multiple advancing fronts of the binder, which fronts meet within the mold and progress to provide rapid filling thereof in which the various corners of the mold achieve full infiltration at about the same time. Rapid and complete filling is also assisted, if desired, by applying vacuum pumping to evacuate the cavity of air and cause it to fill with binder more quickly.

A further object is to provide apparatus wherein the filler aggregate is prevented from entering the gating tubes before pumping of the binder begins by inserting a rod in each tube from the end opposite the end of the tube connected to the pump, and then withdrawing the rod as the binder enters the tube. The slope of the conical pattern of the binder front as it leaves the tube can be controlled further by changing the rate of withdrawal of the rod from the tube whereby to cause the infiltration to occur from the bottom of the cavity upwardly at a steeper or shallower angle.

Another object of the invention is to provide internal gating apparatus in which the gating tubing is spaced and curved to approximate the coutour of the mold so that there are no remote zones of the cavity that are more difficult to fill. This is done by using bent rigid tubing, or by using flexible tubing packed in the aggregate to follow a curved mold.

It is a further object of the invention to provide a process whereby the internal gating tubes can be left in the cured article and cut off near their surfaces, or whereby the tubes can be withdrawn from the article before curing is completed, and the resulting openings filled with mixed foam and fillers which are then cured in the article.

Other objects and advantages of the invention will become apparent during the following discussion of the drawings.

BRIEF DESCRIPTION OF THE DRAWINGS

FIG. 1 is a sectional view of a typical prior art mold in which infiltration of the aggregate filler by the binder is achieved from a port at the bottom of the mold;

FIG. 2 is a view similar to FIG. 1 but showing a modified prior art mold in which infiltration of the filler by the binder is achieved using two external gating tubes running up the sides of the mold;

FIG. 3 is a sectional view of a first embodiment of the present invention showing a central internal gating tube through which the binder infiltrates the mold;

FIG. 4 is a sectional view of a second embodiment of the present invention showing multiple internal gating tubes through which the binder infiltrates the mold;

FIG. 5 is a sectional view of a third embodiment of the present invention showing an internal gating tube which has been bent to more nearly follow the contour of the mold;

DETAILED DISCUSSION OF THE DRAWINGS

Figure 6:
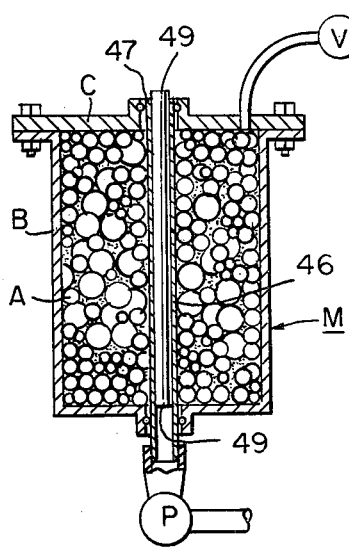
FIGS. 6, 7 and 8 are three sequential sectional views of a modified embodiment of the present invention showing a central gating tube having a rod inserted into it while the filler is being packed into the mold, the rod subsequently being withdrawn from the gating tube as the binder is pumped thereinto, and the rod finally being removed altogether from the tube and the tube plugged so that pumping may be resumed.

Referring now to the drawings, FIG. 1 shows a typical prior art apparatus comprising a mold M including a mold body B having a removable cover C which is secured by screws S to a flange F around the top of the body. The mold has breather holes H through the cover to permit the escape of air as the mold is filled. The mold cavity K is filled with aggregate A packed as closely as possible without crushing the spheres, and an entry port E is provided with a nipple N which connects to external tubing T through which a binder such as resin or syntactic foam is pumped from a pump P connected to a reservoir R. As the pumping progresses, the binder B infiltrates the interstices between the aggregate A along an advancing front represented by the dashed line L, all as well known in the art. In case of a larger mold it is common to use multiple entry ports E connected by a manifold (not shown) to the pump P.

FIG. 2 shows another prior art technique in which similar parts are labeled with similar reference characters, and in which the body B of the mold M is provided with one or more linear external gates G connected at their lower ends with a manifold D which in turn connects with the pump P. In this case the infiltration pattern progresses from the external gates G along upwardly diverging curved paths Q. In this type of mold, it is common to evacuate the mold of air using a vacuum pump V since the lower portions of the curved fronts might otherwise tend to entrap air if they first intersect above the bottom of the mold. Of course, it is also common to use vacuum techniques on the mold of FIG. 1, or on any of the other molds shown in the various illustrative embodiments of the drawings. One problem with this type of gating is that gating discontinuities in the finished product are located right on the outside surfaces of the buoyancy module.

The invention is illustrated in the embodiments of FIGS. 3 through 10 as described below, wherein similar reference characters are used to designate similar parts.

FIG. 3 shows a mold M having a body B and a cover C secured by suitable screw means S to the flange F of the body, and breather holes H in the zones of the cavity K which are likely to fill last with binder. However, according to this invention, the mold is provided with an internal centrally located gating tube 10 having multiple openings 12 through its side walls, which holes are located entirely inside the cavity K of the mold M. The tube 10 extends substantially all the way through the cavity K, spaced from the internal surfaces of the mold, and passes outwardly through a sealed port in the bottom of the mold, the port having a boss 14 containing a sealing O-ring 16, which tightly seals the mold to the gate tube 10 but allows the tube to slide in the boss 14 so that it can be installed or removed therethrough for the purpose hereinafter stated. The bore of the portion 18 of the tube 10 which extends from the boss 14 communicates with the tubing T which leads to the pump P and reservoir R.

When the mold is closed and the pump started, binder flows into the gate tube 10 and out through its openings 12 to infiltrate the interstices between the aggregate A along an expanding approximately conical front 20 which progresses to further-expanded subsequent locations such as the front 21. The steepness of the front is almost vertical when syntactic foam is being infiltrated because it is very viscous and therefore gravity has little effect upon its flow pattern. However, where a less viscous binder, such as neat resin, is being pumped the conical flow will tend to be less vertically oriented and will resemble more closely a catenary contour such as is shown at 22 because the flow will be more affected by gravity.

FIG. 4 shows a modification of the invention for use where the mold is larger. In this embodiment, the mold M' has multiple internal gating tubes 30, 32, 34 and 36 entered into it through bosses, two of which are labeled 14 and include sealing rings 16 similar to those shown in FIG. 3. The tube 36 communicates through a boss 15 and is supported therein by an internal step 17, and the tube 34 communicates with the manifold 38 through a boss 19, this tube sitting on the bottom wall of the mold M' and being held aligned with the boss 19 by a bead J of sealing material. The tubes are fed by binder taken from a manifold 38 which is fed by a pump P taking binder from a reservoir R. The tubes 30, 32, 34 and 36 are all provided with openings which are located entirely inside the cavity K. For purposes of showing that the openings need not take a specific form, the tube 30 is shown with round holes 31, the tube 32 is shown with saw-cut slits 33, the tube 34 is shown with elongated slots 35 which are available in a standard manufactured type of tubing, and the tube 36 is made of screening which is rolled to form a tube. This screening can be metal, plastic, or resin impregnated fabric, etc. However, in a practical installation all of the tubes would probably have the same type of openings. Ordinarily, in cases where the smallest aggregate fillers A are not excessively small, it is desirable to use tubes having openings which are smaller than the aggregate so that the aggregate will not enter the tubes while the cavity is being dry-packed. In cases where the aggregate is smaller than the size of the holes in the tubes, the technique described below with reference to FIGS. 6, 7 and 8 will be used.

FIG. 5 shows an irregularly shaped mold which is provided with multiple tubes to achieve better distribution of the binder during infiltration. The tubes can be bent where appropriate to follow a contour of the mold what needs special attention to insure filing of the entire cavity without voids. The mold M" shown in FIG. 5 has one straight tube 40 and one bent tube 42 respectively provided with openings 41 and 43. As in FIG. 4 the tubes are fed by a manifold D, and extend all the way through the cavity K. The tube, or tubes, which are curved can be rigid plastic tubing which is bent, or they can be made of flexible tubing which is curved to follow the desired contour as the aggregate A is packed into the cavity, the aggregate holding the flexible tubing in place during pumping.

Figure 7:
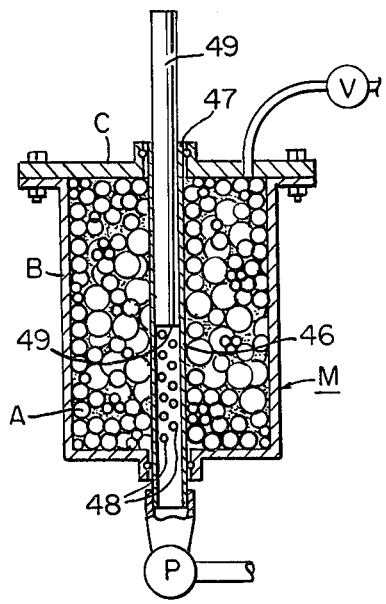
Figure 8:
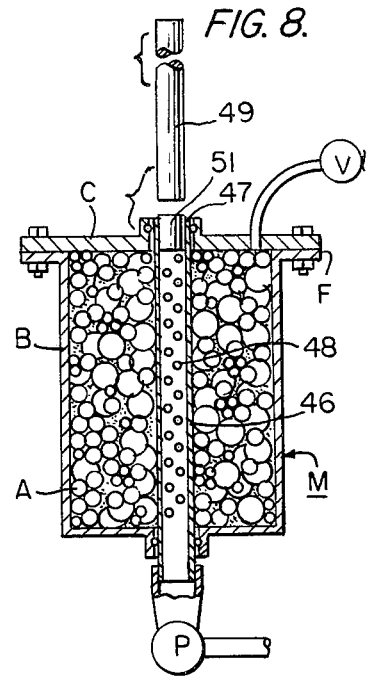

FIGS. 6, 7 and 8 show three successive views of the same mold M which has an internal gating tube 46 extending through its cavity and out of the mold at both of its ends. The lower end of the tube 46 is connected to the pump P and reservoir R as in FIG. 3, but the upper end 47 of the tube 46 extends from the cover C of the mold a short distance. The tube 46 has openings 48 therein which are located entirely within the cavity K which is filled with various sizes of aggregate. This is done frequently to achieve more efficient aggregate packing of the interstices wherein smaller diameter aggregate particles fill the interstices between larger aggregate to provide a finished article having lower density than would be achieved by the use of a single larger size of aggregate, since more binder would be required in the latter case. However, the use of small aggregate particles raises a problem, because during dry-packing of the cavity the small aggregate tends to enter the tube through its openings and partially clogs the bore of the tube, thereby choking the rapid filling and free flow desired for the binder. To prevent entry of smaller aggregate into the tube, a snug fitting rod 49 is passed into the tube 46 from it upper end 47 and is lowered to a level below the last of the openings 48. Subsequently, when pumping is commenced the rod is gradually pushed upwardly as the resin fills the tube, an intermediate position being shown in FIG. 7. It may also be desirable to evacuate the air from the breather holes H to assist the resin to flow more quickly through the filler aggregate, since the density of packing of the aggregate has been increased to reduce the volume of the interstices. For this purpose a vacuum pump V is shown connected to the breather holes. The rod 49 can be simply pushed upwardly by the flow of binder into the tube 46, or alternatively it can be deliberately withdrawn more slowly, as discussed in connection with FIG. 9, for the purpose of changing the slope of the front to cause the withdrawal of the rod to progress at a rate proportional to the rate of filling of the cavity K. When the rod 49 has been removed entirely from the end 47 of the tube 46, the open end is plugged with a plug 51 inserted in the bore of the tube at its end 47 so that pumping may be continued without loss of binder, as shown in FIG. 8.

Figure 9:
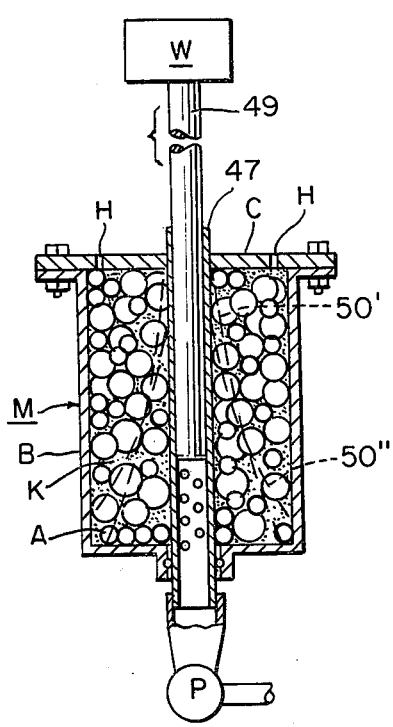
FIG. 9 is a sectional view similar to FIG. 7 showing different conical shapes of binder flow-fronts that can be achieved within the cavity by changing the rate of withdrawal of the rod from the gating tube.

FIG. 9 shows more clearly the use of the weight W on the rod 49. When a light weight is used, the binder quickly pushes the rod 49 from the bore of the tube 46 and therefore a fairly steep flow front 50' occurs. If a heavier weight W is used, the front 50" is more shallow. The latter technique might tend to fill the interstices more completely than the former in a case where the aggregate A is very densely packed and the binder is highly viscous. With a less viscous binder and/or less densely packed packed filler, the steeper front 50' will fully infiltrate the interstices and will fill the mold more quickly.

Figure 10:
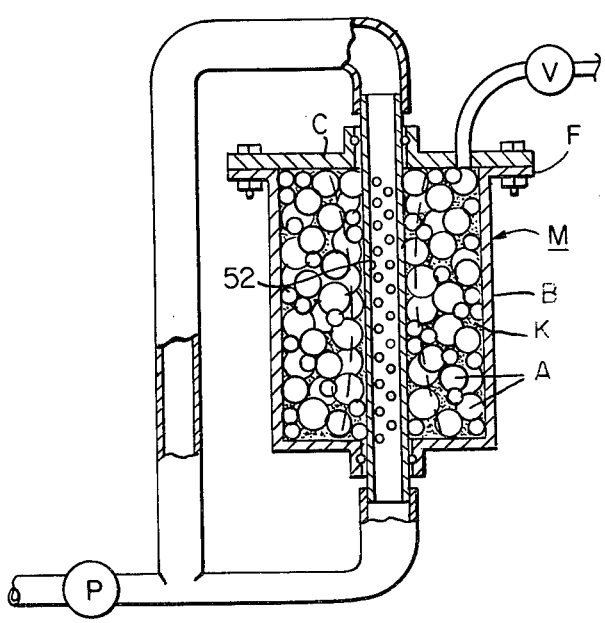
FIG. 10 is a sectional view of a further embodiment of the present invention showing a central gating tube through which the binder is pumped into the mold from both ends of the tube.

FIG. 10 shows one of many possible variations of the present invention, wherein the tube 52 extends from both ends of the mold cavity K and is joined to the pump P at both its ends to achieve quicker filling of the mold. This technique is especially useful where the mold is evacuated of air using a vacuum pump V, so that no pockets of air will be left to cause voids in the finished product due to a less well-controlled frontal pattern that tends to characterize the advance of the binder from a tube that is pumped from both ends. Although the gating tubes are shown vertically oriented, they can be horizontally or diagonally disposed in the cavity, especially where the mold is evacuated of air during infiltration of the binder.

This invention is not to be limited to the illustrative embodiments of the present drawings for obviously changes in the material, the placement, and the contour of the gating system can be made within the scope of the following claims.

1. A process for the internal gating of molds used to prepare a shaped article comprising a composite of aggregate filler and a curable binder, the process comprising the steps of:
   (a) preparing a mold having multiple surfaces enclosing its cavity, and extending gating tube means into the mold through at least one of its surfaces, the tube means extending through the mold cavity spaced from its surfaces, at least one surface of the mold having breather holes, and the tube means having walls with multiple openings therethrough which are located inside the mold cavity and distributed throughout the length of the tube means therewithin;
   (b) filling the cavity of the mold outside of the tube means with aggregate filler packed in close mutual proximity to leave minimum interstitial spaces therebetween;
   (c) pumping liquid binder into the tube means to cause it to extrude outwardly into the mold cavity through said wall openings to fill said interstitial spaces along a progressively expanding binder front while expelling air from said breather holes; and
   (d) curing the binder after the cavity is filled therewith.

2. The process as set forth in claim 1, wherein the article is removed from the mold after curing of the binder, and the further step of cutting off the protruding tube means flush with the surface of the article.

3. The process as set forth in claim 1, wherein said pumping of liquid binder is continued until binder has extruded from all the air breather holes, then withdrawing the tube means from the mold and packing the hole left thereby with aggregate filler and binder.

4. The process as set forth in claim 1, including extending the tube means through the mold cavity and outside the mold at plural locations on the mold surfaces; and pumping binder into the tube means simultaneously through plural mold surfaces.

5. The process as set forth in claim 1, wherein the gating tube means comprise multiple gating tubes extending through mold surfaces and through the mold cavity at spaced intervals interiorly thereof, and wherein liquid binder is pumped into the cavity through all of said gating tubes.

6. The process as set forth in claim 1, wherein the air is evacuated from the mold cavity through the breather holes while the liquid binder is pumped into the mold through the internal gating tube means.

7. The process as set forth in claim 1, including extending the tube means through the cavity and outside the mold at both ends of the tube means, inserting a snug fitting rod into the tube means from one end to virtually fill the tube means, and pumping said liquid binder into the other end of the tube means while gradually withdrawing the rod from said one end of the tube means as the mold fills with the binder.

8. The process as set forth in claim 1, wherein said mold has irregularly curved contours, the step of shaping said gating tube means to follow said curved contours.

9. The process as set forth in claim 1, wherein said aggregate filler comprises hollow spheres ranging from about 60 microns to several inches in diameter.

10. The process as set forth in claim 1, wherein said binder comprises a viscous curable syntactic foam formed of polymeric resin filled with microspheres of about 60 microns in diameter.

11. Apparatus for the internal gating of a mold used for preparing a shaped article comprising a composite of aggregate filler and a curable binder, the apparatus comprising:
 (a) a mold having multiple surfaces enclosing a cavity and having air breather holes through one of said surfaces and having binder-filling port means extending through at least one of said surfaces;
 (b) gating tube means having a central bore communicating with said port means passing through at least one of said surfaces, the gating tube extending through the mold cavity in spaced relationship to its surfaces, the walls of the tube means inside the cavity having multiple opening therethrough communicating from the bore of the tube means into the cavity, the openings being distributed along the length of the tube walls located in the cavity, the space within the cavity of the mold and outside of the tube means receiving said aggregate filler; and
 (c) pump means connected through the port means to the tube means and operative to pump binder into the tube means from outside the mold, and through the openings to fill the cavity and occupy the interstitial spaces between the filler aggregate while expelling air from the breather holes.

12. Apparatus as set forth in claim 11, wherein said openings in the walls of the tube means are smaller in diameter than the diameter of said filler aggregate.

13. Apparatus as set forth in claim 11, wherein some of said filler aggregate is smaller in diameter than said openings in said tube means, and a rod which is a snug fit in the bore of the tube means being inserted therein to keep the aggregate from entering the tube means, the rod being withdrawn from one end of the tube means as binder is pumped into the other end of the tube means.

14. Apparatus as set forth in claim 11, wherein a tube means has plural ends extending outside the mold at plural port means; and manifold means connecting said tube means ends together and to said pump means.

15. Apparatus as set forth in claim 11, wherein said gating tube means comprise multiple gating tubes extending from the mold surfaces through the cavity in mutually spaced relationship interiorly thereof, and manifold means connecting said gate tubes to said pump means.

16. Apparatus as set forth in claim 11, further comprising vacuum pump means connected to said cavity through said air breather holes, and operative to evacuate the mold while said pumping means is pumping binder thereinto.

17. Apparatus as set forth in claim 11, wherein said mold surfaces having curved contours, and wherein said gating tube means comprise tubing curved to follow said contours.

18. Apparatus as set forth in claim 11, wherein said tube means comprises a gating tube extending through the mold cavity and outside the mold at both of its ends, a snug fitting rod inserted in the gating tube from one end and virtually filling the tube, the pumping means being connected to the other end of the tube, and means for biasing the rod to yieldably resist its expulsion from said one end of the tube, whereby the rod is expelled gradually to cause the filling of the tube with said binder to progress at a rate proportional to the rate at which the cavity is filled.

19. Apparatus as set forth in claim 11, wherein said aggregate filler comprises sealed hollow macrospheres, and said binder comprises syntactic foam made of curable resin filled with hollow microspheres up to about 60 microns in diameter.

* * * * *